US006606648B1

(12) United States Patent
Mukundan et al.

(10) Patent No.: US 6,606,648 B1
(45) Date of Patent: Aug. 12, 2003

(54) METHOD FOR HANDLING ACCESSES TO A MAILBOX

(75) Inventors: Purandar Mukundan, Boulder, CO (US); Lynda L. Bain, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/344,531

(22) Filed: Jun. 25, 1999

(51) Int. Cl.[7] .............................................. G06F 15/16
(52) U.S. Cl. ...................................... 709/206; 709/214
(58) Field of Search ................................ 709/202, 203, 709/206, 207, 238, 214; 379/88.17, 67.1

(56) References Cited

U.S. PATENT DOCUMENTS

| | | | | | |
|---|---|---|---|---|---|
| 5,435,544 | A | * | 7/1995 | Mandel | 271/298 |
| 5,627,764 | A | * | 5/1997 | Schutzman et al. | 709/207 |
| 5,734,820 | A | * | 3/1998 | Howard et al. | 713/200 |
| 5,787,153 | A | * | 7/1998 | Bankay et al. | 379/88 |
| 5,991,365 | A | * | 11/1999 | Pizano et al. | 379/88.13 |
| 6,018,762 | A | * | 1/2000 | Brunson et al. | 709/206 |
| 6,175,859 | B1 | * | 1/2001 | Mohler | 709/206 |
| 6,226,359 | B1 | * | 5/2001 | Montgomery et al. | 379/67.1 |
| 6,233,318 | B1 | * | 5/2001 | Picard et al. | 379/88.17 |
| 6,360,272 | B1 | * | 3/2002 | Lincke et al. | 709/238 |
| 6,393,463 | B1 | * | 5/2002 | Fuchigami | 709/206 |

OTHER PUBLICATIONS

Hofmann et al, INGate: Integrating Telephony and Internet, IEEE 1997.*
Baird et al, Next–generation Multimedia Messaging, IEEE 1997.*

* cited by examiner

Primary Examiner—Mark R. Powell
Assistant Examiner—Thong Vu
(74) Attorney, Agent, or Firm—Brooks & Kushman P.C.

(57) ABSTRACT

A method for handling multiple accesses to a messaging mailbox prompts the user for action when the status indicates an active session in the mailbox. The method includes receiving a request from a user to access the mailbox to retrieve messages, and determining the session status in the mailbox. If the session status indicates an active session in the mailbox, the user is prompted for action, otherwise, the user is granted access to the mailbox.

21 Claims, 4 Drawing Sheets

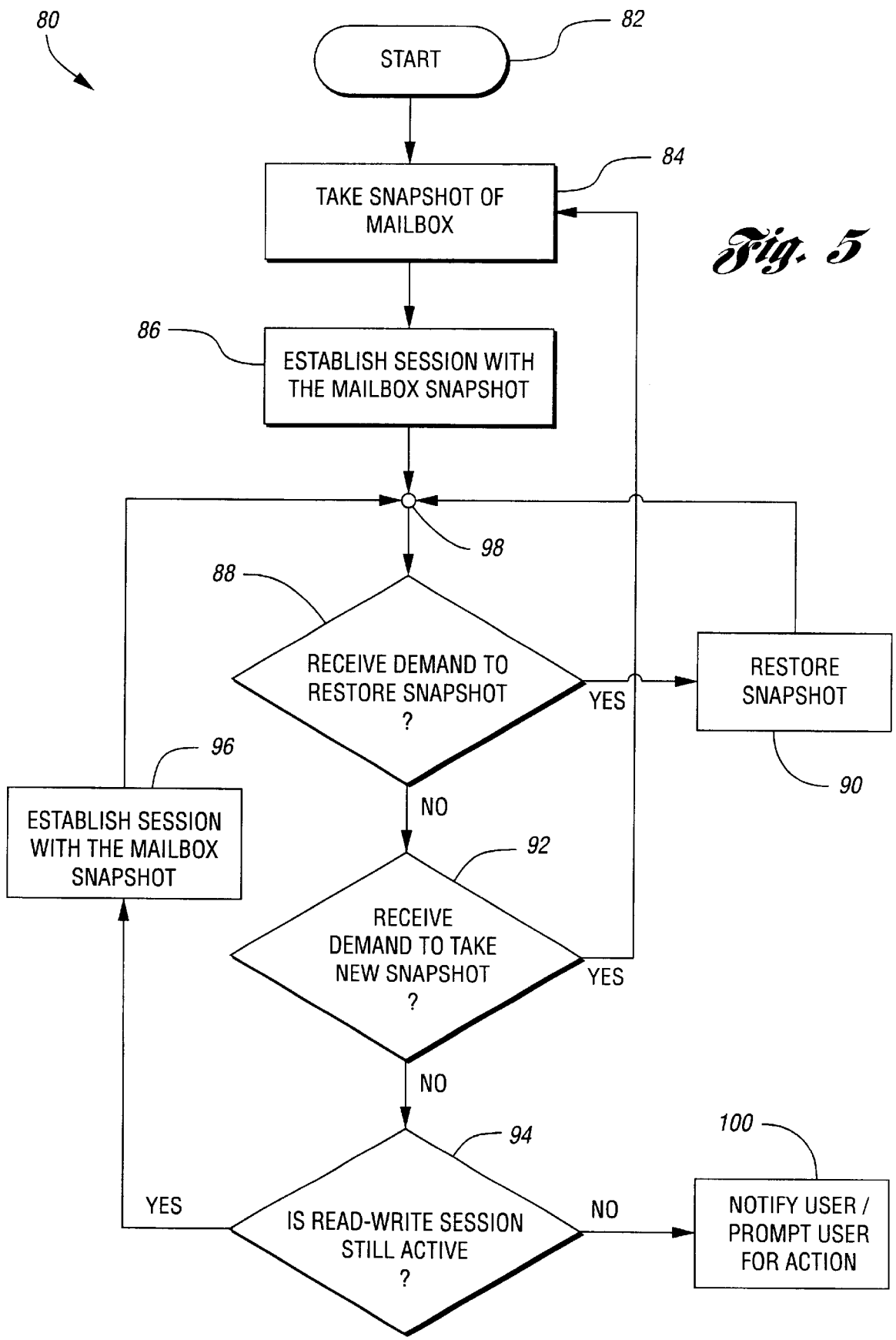

METHOD FOR HANDLING ACCESSES TO A MAILBOX

TECHNICAL FIELD

The present invention relates to methods and systems for handling multiple accesses to a messaging mailbox.

BACKGROUND ART

The use of automated messaging systems has become widespread. For example, email and/or voicemail systems are present in many medium to large sized businesses. Further, some messaging systems are configured for unified messaging. A unified messaging system allows a message created at one type of interface to be received by the recipient at a different type of interface. For example, in a unified messaging system, email may be received over a voice telephone interface.

In email messaging systems, voicemail messaging systems, and unified messaging systems, each user account is assigned a mailbox. The common practice is to allow only one session in a particular mailbox at a time. When there is a session in progress in a messaging mailbox, subsequent login attempts while the session is active result in access-to-retrieve-messages being denied. Sometimes, the denial of access-to-retrieve-messages when a session is active, which is usually accompanied by a message such as "this mailbox is currently in use, and cannot be accessed at this time," may become very frustrating when the person attempting to logon is the owner of the mailbox.

For example, a person may have been at one location checking the contents of his or her mailbox on a computer, and decided to leave that location, but forget to logout of the mailbox. Later, the person may decide to access his or her mailbox from a different location to retrieve messages, but will be denied access because the previous session is still active.

For the foregoing reasons, there is a need for a method and system that handles multiple accesses to a messaging mailbox in a way that overcomes the problem of the prior art.

DISCLOSURE OF INVENTION

It is, therefore, an object of the present invention to provide a system and method for handling multiple accesses to a messaging mailbox to retrieve messages, that prompts the user for action during a logon attempt when there is an active session in the mailbox.

In carrying out the above object, a method for handling multiple accesses to a messaging mailbox is provided. The method comprises receiving a request from a user to access the mailbox, and determining a session status in the mailbox. The method further comprises, if the status indicates an active session in the mailbox, prompting the user for action, and otherwise, granting the user access to the mailbox to retrieve messages.

In a preferred embodiment, prompting the user for action comprises prompting the user to select an action from a set of options. The set of options includes the option to disconnect the active session. When prompting the user for action, it may be desirable to notify the user of one or more of the following: an idle time of the active session, a location of the active session, and an interface type for the active session (such as electronic or voice). Of course, other information may be presented to the user such as, for example, an active time for a session (when the session is active and not idle).

Further, in a preferred embodiment, the set of options includes the option to start a read-only session. Upon selection of the option to start a read-only session, a read-only session is started, preferably, by taking a snapshot of the mailbox and, thereafter, establishing a session with the mailbox snapshot.

In read-only mode, it may be desirable to provide additional features. In one embodiment, upon demand, the snapshot may be reverted to the snapshot taken at the start of the read-only session. In another embodiment, upon demand, a new snapshot of the mailbox is taken and a session is established with the new mailbox snapshot. The new mailbox snapshot then reflects the current contents of the mailbox, which may have changed since the previous snapshot was taken. Further, embodiments of the present invention may, upon disconnection of the active session that resulted in the user only being able to have read-only access, notify the user of the option to start a read/write session in the mailbox.

Further, in carrying out the present invention, a method for handling multiple accesses to a messaging mailbox is provided. The method comprises receiving a request from a user to access the mailbox, and determining a session status in the mailbox. If the status indicates an active session in the mailbox, the user is prompted to select an action from a set of options. The set of options includes the option to disconnect the active session. Upon selection of the option to disconnect the active session, the active session is disconnected and, thereafter, the user is granted access to the mailbox to retrieve messages. In the event that the status did not indicate an active session in the mailbox, the user would be granted access to the mailbox without being prompted to select an action.

Still further, in carrying out the present invention, a system for handling multiple accesses to a messaging mailbox is provided. The system comprises a messaging server having control logic operative to receive requests from a user to access the mailbox to retrieve messages, and determine a session status in the mailbox. The control logic is further operative to, if the status indicates an active session in the mailbox, prompt the user for action, and otherwise, grant the user access to the mailbox.

It is to be appreciated that the messaging server may be, for example, a voice messaging server, an email messaging server, a fax messaging server, or a unified messaging server operative to handle voice, email, and fax messages. Preferably, when the control logic prompts the user for action, the user is prompted to select an action from a set of options including the option to start a read-only session. In this preferred embodiment, upon selection of the option to start a rea-donly session, a read-only session is started by taking a snapshot of the mailbox and, thereafter, establishing a session with the mailbox snapshot. Further, in a preferred embodiment, the control logic is further operative to, upon disconnection of the active session, notify the user of the option to start a read/write session in the mailbox. Further, in a different variation of read-only access, the user may establish a read-only session with a single message snapshot at a time (as opposed to a mailbox snapshot).

The advantages associated with embodiments of the present invention are numerous. For example, methods and systems of the present invention handle multiple accesses to a messaging mailbox by prompting the user to select an action from a set of options when there is already an active session in the mailbox. Embodiments of the present invention allow the user to disconnect sessions that were inadvertently left connected to prevent those sessions from blocking access by the user. Further, embodiments of the present invention may also be utilized with a shared mailbox. It is contemplated that the user sharing the mailbox includes a primary user that has the option to terminate other active sessions, while the other members and the primary user of the group may have the option to start a read-only session when the mailbox has a currently active session during an attempt to access the mailbox.

The above object and other objects, features and advantages of the present invention are readily apparent from the following detailed description of the best mode for carrying out the invention when taken in connection with the accompanying drawings.

BRIEF DESCRIPTION OF DRAWINGS

FIG. 5 is a block diagram illustrating a preferred method for providing the read-only session.

BEST MODE FOR CARRYING OUT THE INVENTION

Figure 1:
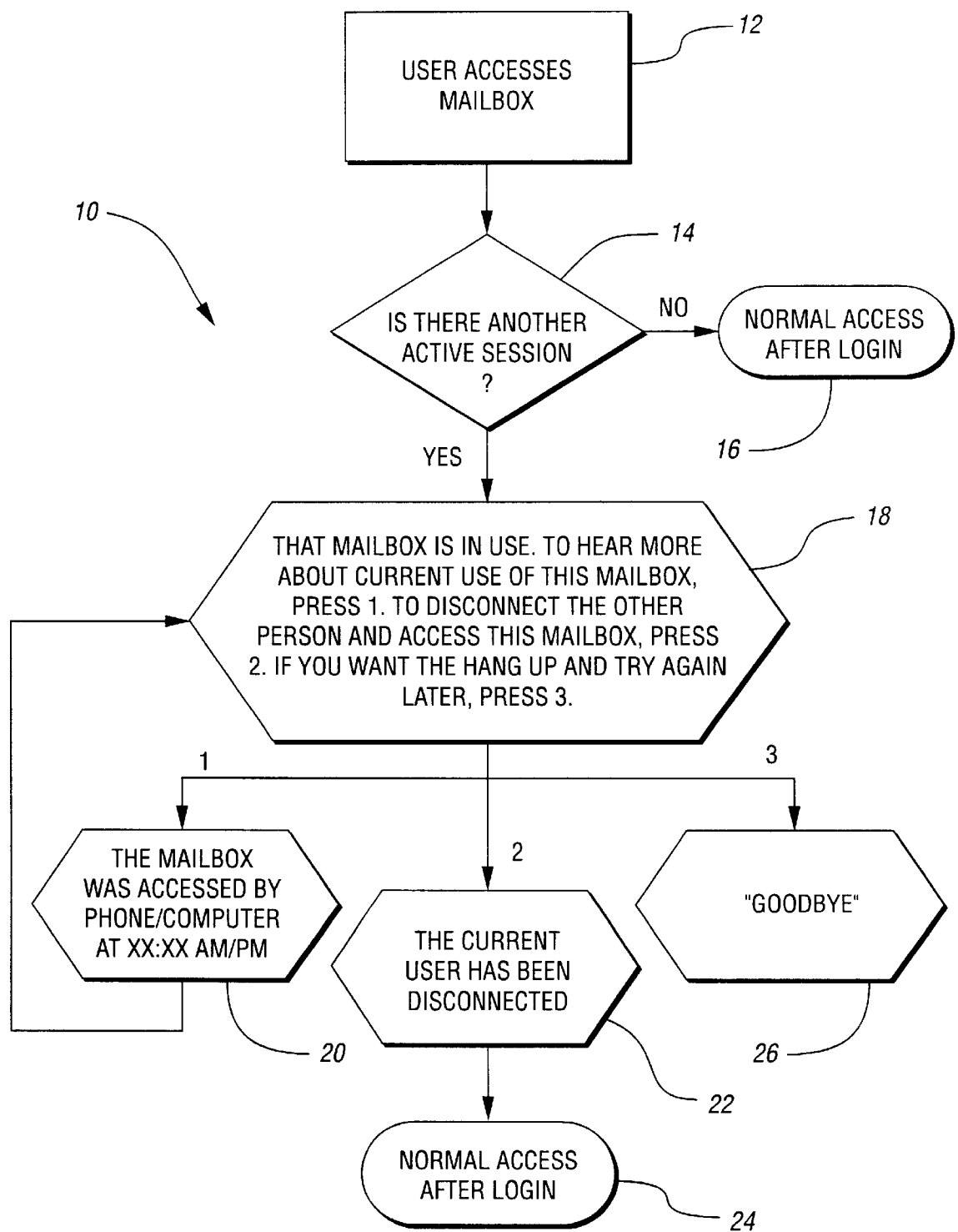
FIG. 1 is a block diagram illustrating a method of the present invention for handling multiple accesses to a messaging mailbox when the user accesses the mailbox through a voice interface.

With reference to FIG. 1, a method for handling multiple accesses to a messaging mailbox is generally indicated at 10. As used herein, the terms "access" and "access-to-retrieve-messages" are used interchangeably. That is, access to a mailbox in the context of the present invention means access to retrieve messages. At block 12, a user requests to access the mailbox. It is to be appreciated that the user may request to access the user mailbox through a plurality of different interfaces, such as in electronic or voice interface, and that FIG. 1 illustrates a method for handling a request at a voice interface (such as a telephone). Preferably, a password authenticated login is required upon requesting access to a mailbox. At block 14, the messaging server determines a session status in the mailbox. That is, the messaging server checks to see if there is another active session in the requested mailbox. If there is not another active session, the user is granted normal access to the mailbox, at block 16.

If the status indicates an active session in the mailbox, the user is prompted for action at block 18. As shown in block 18, the user is informed that the mailbox is in use and preferably given the following options: the option to hear more about the current use of this mailbox by pressing "1", the option to disconnect the other person and access this mailbox by pressing "2", and the option to hang up and try again later by pressing "3". It is to be appreciated that other options may be provided to the user if desired, such as the option to connect a read-only session as described elsewhere herein.

When the first option is selected, the user is informed of more information regarding the current use of the mailbox, at block 20. The additional information about the mailbox may include, for example, an idle time of the active session, a location of the active session, and an interface type for the active session. By notifying the user of one or more of these information items, the user may make a reasonable determination as to the reason for the existing connection before deciding whether or not to disconnect that connection. Further, other information may be provided to the user such as, for example, an active time of the active session (when there is no idle time).

When the second option is selected by the user, the current user (the active session) is disconnected, at block 22. Thereafter, the user is granted normal access to the mailbox, at block 24. That is, the normal access that is ordinarily provided after login is now provided. And lastly, when the user selects the third option, the user is completely disconnected from the messaging system, at block 26.

Figure 2:
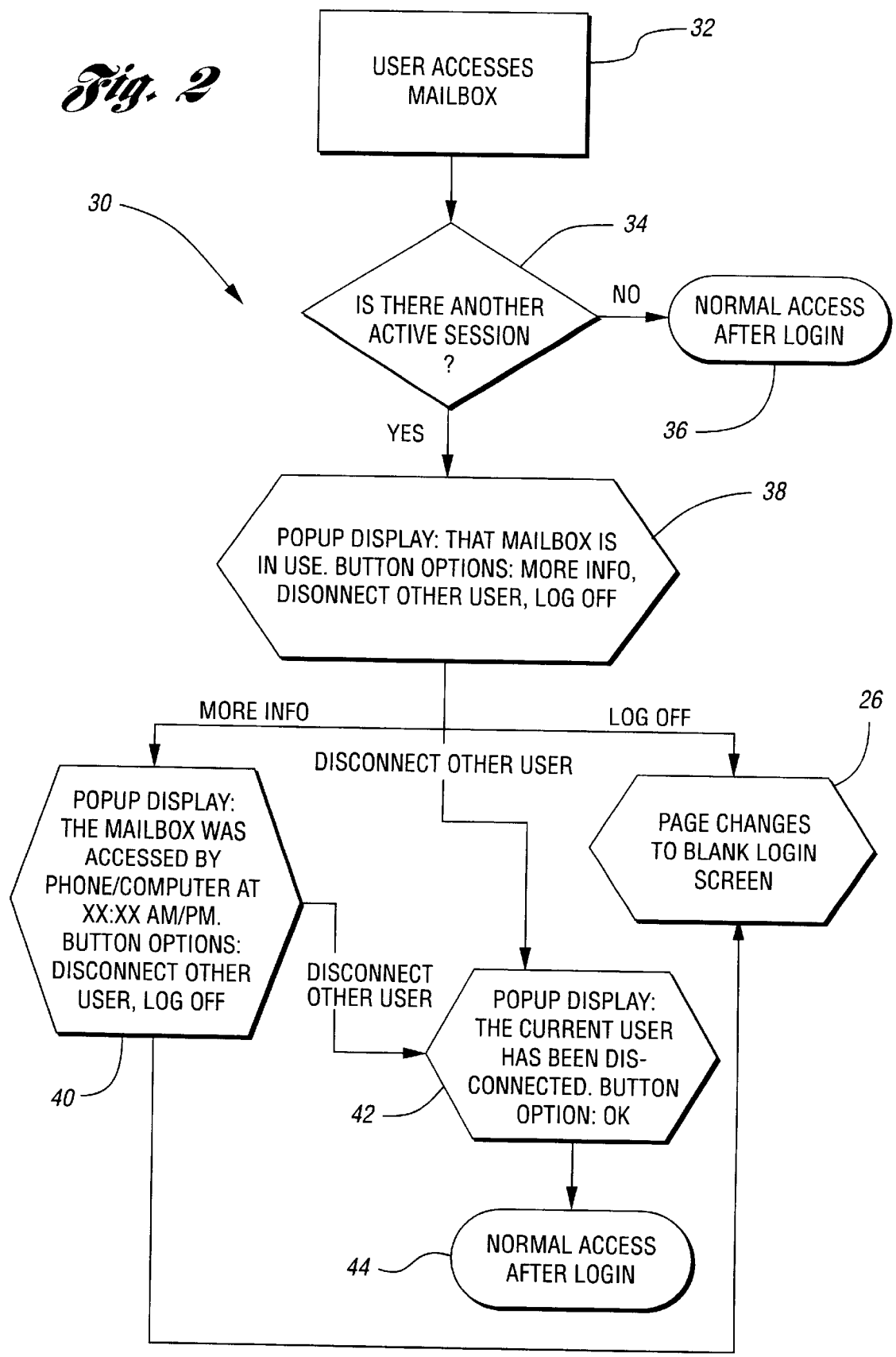
FIG. 2 is a block diagram illustrating a method of the present invention for handling multiple accesses to a messaging mailbox when the user accesses the mailbox from an electronic interface, such as a terminal or terminal emulating software.

As best shown in FIG. 2, embodiments of the present invention are equally suitable for handling multiple accesses to a messaging mailbox when the subsequent access is through an electronic interface such as a terminal or emulated terminal. Further, it is to be appreciated that the currently active session may be through a different interface type then the interface type being used by the user for the subsequent access attempt. At block 32, the user requests to access the mailbox. Preferably, a password authenticated login is required upon requesting access to a mailbox. At block 34, the messaging server determines a session status in the mailbox by checking to see if there is another active session. If the status indicates that there is no other active session, then normal access is granted to the user, at block 36.

If the status indicates an active session in the mailbox, the user is prompted for action at block 38. Block 38 illustrates an exemplary prompt for action that is suitable for a display interface such as a terminal screen. At block 38, a pop-up display indicates that the mailbox is in use. The user is given several push button options, including a "more information" button, a "disconnect other user" button, a "logoff" button. The user may then select one of the available options, similar to the user at a voice interface pressing a button on a telephone to select an available option. It is to be appreciated that embodiments of the present may utilize any suitable technique for selecting an option, including telephone buttons, on-screen display buttons, direct voice commands, or any other suitable technique. Further, a "read-only" option is also given in preferred embodiments of the present invention.

At block 40, when more information is requested, a pop-up display is used to indicate information relating to the session in progress. For example, the display may indicate an idle time of the active session (or an active time if the session is not idle), a location of the active session, and/or an interface type for the active session. For example, the pop-up display may read as follows: "this mailbox was accessed by <phone/computer> at <xx:xx am/pm>". Further, the user may be given button options, such as "disconnect other user" and "logoff". Selecting the button to disconnect the other user from either block 40 or from block 38 results in flow proceeding to block 42. At block 42, the active session is disconnected, and the user is granted normal access to the mailbox, at block 44. And lastly, if "logoff" is selected at either block 38 or at block 40, flow proceeds to block 46 where the user is completely disconnected from the messaging server (for example, a blank login screen may be presented).

Figure 3:
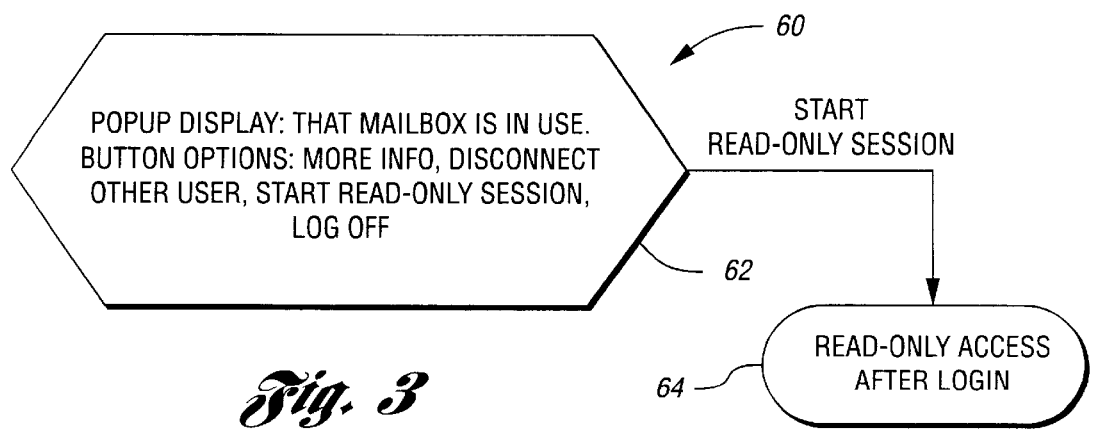
FIG. 3 is a block diagram illustrating the option to start a read-only session through an electronic interface.

With reference to FIG. 3, a preferred embodiment of the present invention that further gives the subsequent user the option to start a read-only session is generally indicated at 60. At block 62, a pop-up display for use when the user accesses the messaging server electronically is shown. Option block 62 of FIG. 3 is similar to option block 38 of FIG. 2, but includes the additional option to start a read-only session. When the user selects to start a read-only session, flow proceeds to block 64. At block 64, the user is granted read-only access.

Figure 4:
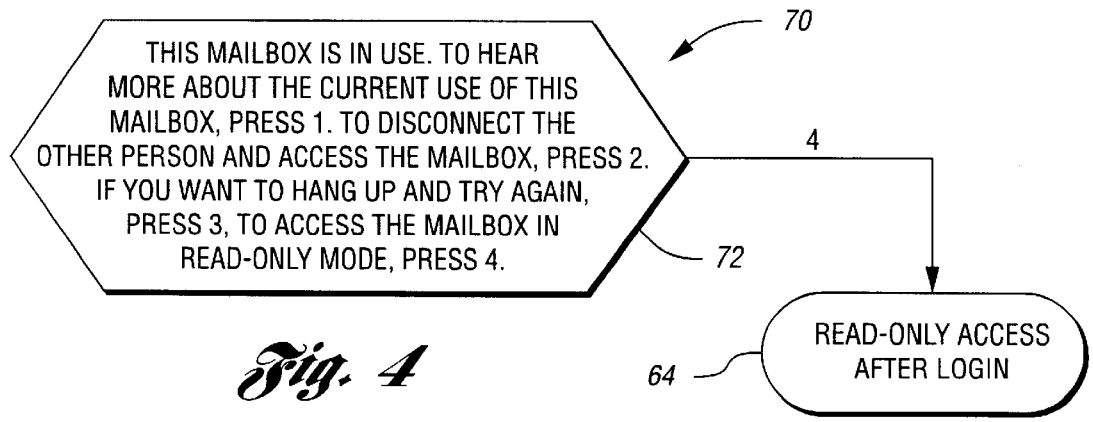
FIG. 4 is a block diagram illustrating the option to start a read-only session through a voice interface.

Similarly, as best shown in FIG. 4, accessing the messaging server through a voice interface also, in a preferred embodiment, gives the option to start a read-only session when the session status indicates an active session in the mailbox. Option block 72 of FIG. 4 is similar to option block 18 of FIG. 1, but the user is given the additional option of starting a read-only session. For example, the same options are presented in block 72 as are presented in block 18, with the additional option of: "to access the mailbox in read-only mode, press '4'". When the user selects to start a read-only session, flow proceeds to block 74 where a read-only access session is started.

It is to be appreciated that methods of the present invention that are described in FIGS. 1–4 may also be used with a shared mailbox. That is, one or more users of the users that share the mailbox may have the privilege of being able to disconnect an active session to access the mailbox in addition to the option of starting a read-only session, while other members of the group may be given only the option to start a read-only session. For example, a shared mailbox may include a number of users where one of the users is the primary controller. As such, the primary controller may disconnect an active session to enter the mailbox, while other users are not given the privilege of being able to disconnect others, but may start a read-only session. Further, although FIGS. 1 and 3, and FIGS. 2 and 4 illustrate electronic and voice access, respectively, embodiments of the present invention may be utilized with other interfaces, including a unified messaging system where messages may be transformed from one form to another. That is, the interface used to receive a message need not be the same as the type of interface used to create the message.

Referring to FIG. 5, a read-only session is described in greater detail for a preferred embodiment of the present invention. The process flow is generally indicated at 80, and is applicable to both electronic and voice accesses to the mailbox. Flow starts at block 82, and proceeds to block 84 where a snapshot is taken of the mailbox. The snapshot is essentially a copy of the mailbox contents. The user accessing the mailbox then can work with the snapshot, and may delete items from the snapshot, without altering the actual contents of the real mailbox. Further, the taking of a snapshot of the mailbox prevents messages from disappearing when the read/write session user decides to delete a message. Of course, if desired, the user accessing in read-only mode can access the actual mailbox instead of taking a snapshot. However, if the real mailbox is accessed in read-only mode, it is possible that messages are instantly deleted by the user in the read/write session. On the other hand, newly arriving messages will then show up in the read-only session. Of course, if desired, the snapshot may be taken at block 84, but in the event that new messages arrive in the real mailbox, those messages may be added to the snapshot and indicated as newly arriving messages.

In the preferred embodiment, at block 86, a session is established with the mailbox snapshot. Preferably, the user is given the option of reverting the snapshot at block 88. That is, the user may modify the contents of the mailbox, and then decide to revert the snapshot to its original condition, passing flow to block 90. At block 90, the snapshot is reverted to the original snapshot.

Further, preferably, the user is given the option of taking a new snapshot at block 92. A new snapshot would bring the snapshot current with the real mailbox. That is, messages deleted in the read/write session would then be deleted from the new snapshot, and newly arriving messages at the real mailbox would show up in the new snapshot. Of course, these newly arriving messages may already have been indicated to the user if the system was implemented with the newly arriving message exception to the taking of the snapshot at block 84, as mentioned previously.

Further, in a preferred embodiment, the messaging server checks to see if the read/write session is still active at block 94. If the read/write session is still active, then flow proceeds to block 96 where the read-only session continues. Preferably, if the read/write session is no longer active, the user is notified at block 100. The user may then be given the option to end the read-only session and begin a read/write session. Alternatively, the system may automatically change the read-only session to a read/write session. However, it is to be appreciated that care must be taken to avoid deleting messages during the transition from read-only to read/write without first notifying the user that some messages present in the snapshot may not be present in the real mailbox and thus may disappear during the transition from read-only to read/write.

In the preferred embodiments, read-only modes allow a user to do several different things with the messages, so long as the true contents of the mailbox on the server are not disturbed. That is, a user in read-only mode may forward messages, reply to messages, print (or print-to-fax) messages. However, the user in the read-only mode may not access personal options. Preferably, an up-front prompt explains the capabilities in read-only mode prior to the user entering the mailbox in read-only mode. Further, it may be desirable to allow a user to copy contents within the mailbox to a local location, without disturbing any of the server contents. As an alternative, read-only access may be provided in a message at a time implementation (as opposed to mailbox at a time). The read-only user could review a message snapshot without the message snapshot reflecting changes from the read/write user (such as deletion of the message). Upon exiting the message review of the individual message, the snapshot is lost.

Although the present invention has been described with reference to email terminal interfaces and voice interfaces, it is to be appreciated that other interfaces such as video interfaces are contemplated by the inventors. That is, systems and methods of the present invention for handling multiple accesses to a messaging mailbox may be employed in messaging systems having a number of different interfaces, including a unified messaging system. Further, messages may take many forms such as email, voice messages, or fax messages.

Figure 6:
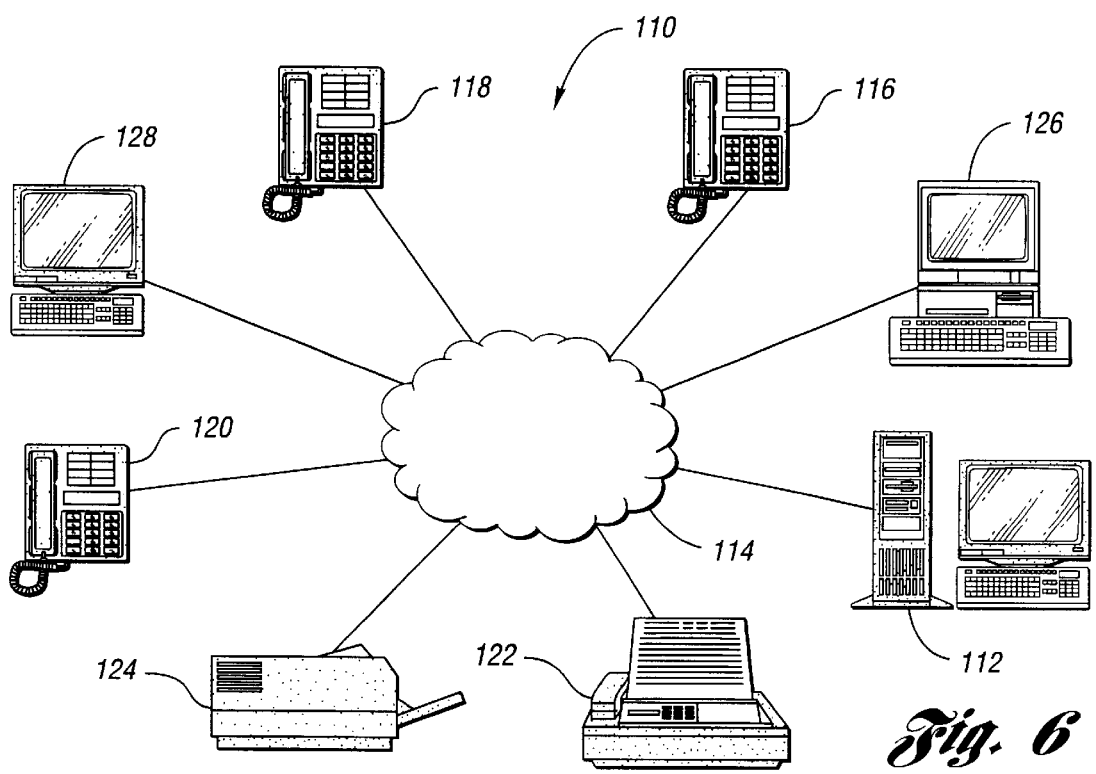
FIG. 6 is a system of the present invention showing a server and a plurality of devices including telephones, a printer, and a fax machine connected to a network.

In FIG. 6, an exemplary configuration for a messaging system is illustrated. A messaging server 112 includes control logic, suitably implemented in software (but not limited to software) operative to prompt a user for action if there is an active session in a mailbox during an access attempt. The server may be an email server, a voicemail server, a combinational server, a unified server, or any other suitable type of server.

The server 112, in the exemplary, embodiment, communicates over a network 114 which may take any known form such as, for a voicemail example, a private branch exchange (PBX) system. Any number of interfaces (including output only interfaces) may be connected to network 114. In the example, telephones 116, 118, 120, fax machine 122, printer 124 (which is an example of an output only interface), computer 126, and terminal 128 are connected to network 114. The control logic at server 112 is operative to receive a user request to access a mailbox to retrieve messages, and to determine a session status in the mailbox. The request for access preferably includes password authentication.

Further, the control logic at server 112 prompts the user for action if the status indicates an active session in the mailbox, and otherwise, grants access. As described previously for methods of the present invention, the user is prompted to select an action from a group of options. The options may include any of those discussed above, such as force disconnect of the current active session or start a read-only session. Further, the "more information" selections and the various operations described previously for read-only mode may all be achieved by appropriate configuration at the server control logic. Further, it is appreciated that system 110 may employ suitable control logic configured to perform, as desired, any of the methods as shown in FIGS. 1–4 and described previously.

While the best mode for carrying out the invention has been described in detail, those familiar with the art to which this invention relates will recognize various alternative designs and embodiments for practicing the invention as defined by the following claims.

What is claimed is:

1. A method for handling multiple accesses to a messaging mailbox, the method comprising:
    receiving a request from a user to access the mailbox;
    determining a session status in the mailbox; and
    if the status indicates an active session in the mailbox, prompting the user for action, otherwise, granting the user access to the mailbox.

2. The method of claim 1 wherein prompting the user for action comprises:
    prompting the user to select an action from a set of options, the set of options including the option to disconnect the active session.

3. The method of claim 1 wherein prompting the user for action comprises:
    notifying the user of an idle time of the active session.

4. The method of claim 1 wherein prompting the user for action comprises:
    notifying the user of a location of the active session.

5. The method of claim 1 wherein prompting the user for action comprises:
    notifying the user of an interface type for the active session.

6. The method of claim 1 wherein prompting the user for action comprises:
    prompting the user to select an action from a set of options, the set of options including the option to start a read-only session.

7. The method of claim 6 further comprising:
    upon selection of the option to start a read-only session, starting a read-only session.

8. The method of claim 7 wherein starting the read-only session further comprises:
    taking a snapshot of the mailbox; and
    establishing a session with the mailbox snapshot.

9. The method of claim 8 wherein establishing the session with the mailbox snapshot further comprises:
    upon demand, reverting the snapshot to the snapshot taken at the start of the read-only session.

10. The method of claim 8 further comprising:
    upon demand, taking a new snapshot of the mailbox; and
    establishing a session with the new mailbox snapshot.

11. The method of claim 7 further comprising:
    upon disconnection of the active session, notifying the user of the option to start a read/write session in the mailbox.

12. A method for handling multiple accesses to a messaging mailbox, the method comprising:
    receiving a request from a user to access the mailbox;
    determining a session status in the mailbox;
    if the status indicates an active session in the mailbox, prompting the user to select an action from a set of options including the option to disconnect the active session, otherwise, granting the user access to the mailbox; and
    upon selection of the option to disconnect the active session, disconnecting the active session and, thereafter, granting the user access to the mailbox.

13. A system for handling multiple accesses to a messaging mailbox, the system comprising a messaging server having control logic operative to:
    receive a request from a user to access the mailbox;
    determine a session status in the mailbox; and
    if the status indicates an active session in the mailbox, prompt the user for action, otherwise, grant the user access to the mailbox.

14. The system of claim 13 wherein the messaging server is a voice messaging server.

15. The system of claim 13 wherein the messaging server is an email messaging server.

16. The system of claim 13 wherein the messaging sever is a unified messaging server operative to handle voice messages, fax messages, and email messages.

17. The system of claim 13 wherein the control logic is further operative to:
    prompt the user to select an action from a set of options, the set of options including the option to disconnect the active session.

18. The system of claim 13 wherein the control logic is further operative to:
    prompt the user to select an action from a set of options, the set of options including the option to start a read-only session.

19. The system of claim 18 wherein the control logic is further operative to:
    upon selection of the option to start a read-only session, start a read-only session by taking a snapshot of the mailbox, and establishing a session with the mailbox snapshot.

20. The system of claim 19 wherein the control logic is further operative to:
    upon disconnection of the active session, notify the user of the option to start a read/write session in the mailbox.

21. The system of claim 18 wherein the control logic is further operative to:
    upon selection of the option to start a read-only session, start a read-only session wherein each message is accessed by taking a snapshot of that message and accessing that snapshot.

* * * * *